Nov. 30, 1943.  H. M. DODGE  2,335,561
ENGINE SEAL
Filed June 24, 1941  2 Sheets-Sheet 1

INVENTOR
HOWARD M. DODGE
BY
Evans + Meloy
ATTORNEYS

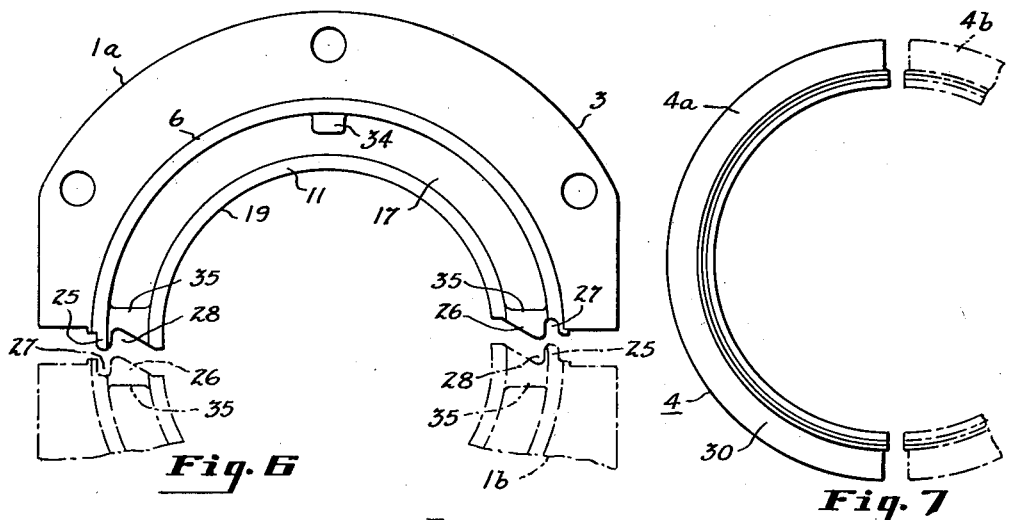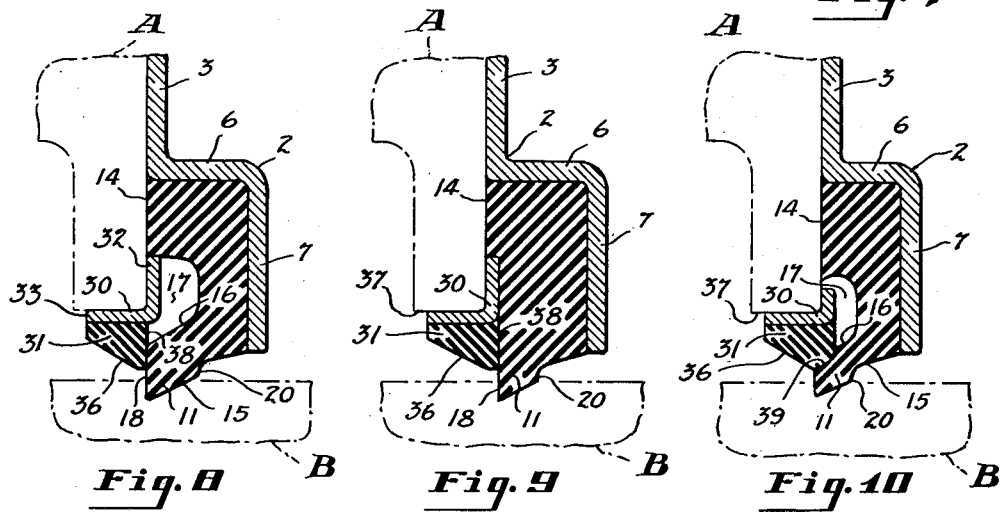

Patented Nov. 30, 1943

2,335,561

UNITED STATES PATENT OFFICE 2,335,561

ENGINE SEAL

Howard M. Dodge, Wabash, Ind., assignor to The General Tire & Rubber Company, Akron, Ohio, a corporation of Ohio Application June 24, 1941, Serial No. 399,494

10 Claims. (Cl. 288—3)

This application is a continuation-in-part of my copending application Serial No. 389,391, filed April 19, 1941, now Patent No. 2,316,941, issued April 20, 1943. The invention disclosed herein relates to improvements in machinery packing and it particularly relates to oil or grease seals which may be readily and effectively assembled around a shaft.

It is an object of the present invention to provide an oil or grease seal which may be assembled around a shaft in an engine housing to provide a leakproof seal between the housing and the shaft.

It is another object of the present invention to provide an oil or grease seal that is relatively easy to assemble around a shaft with its component parts in correct alignment.

It is a further object of the present invention to provide an oil or grease seal which contains no metal springs and wherein the sealing pressure is concentrated adjacent the tip of a molded, resilient sealing member.

It is a still further object of the present invention to provide an oil seal having extremely long wearing properties and which may be readily manufactured at comparatively low cost.

Other objects will be apparent from the following detailed description of the invention, as illustrated in the accompanying drawings, in which:

Fig. 6 is a partial elevational view of the main body portion of the seal with sections thereof in separated position to show the tongue and groove aligning means;

Fig. 7 is a partial elevational view of sections of the split pressure ring which cooperates with the main body portion of the seal illustrated in Fig. 6;

Fig. 8 is a sectional view, similar to that shown in Fig. 5, of a slightly modified form of seal embodying the present invention;

Fig. 9 is a sectional view, similar to that shown in Fig. 5, of another modified form of seal embodying the present invention; and Fig. 10 is a similar sectional view taken through a portion of still another modified form of seal.

Figures 1, 2:
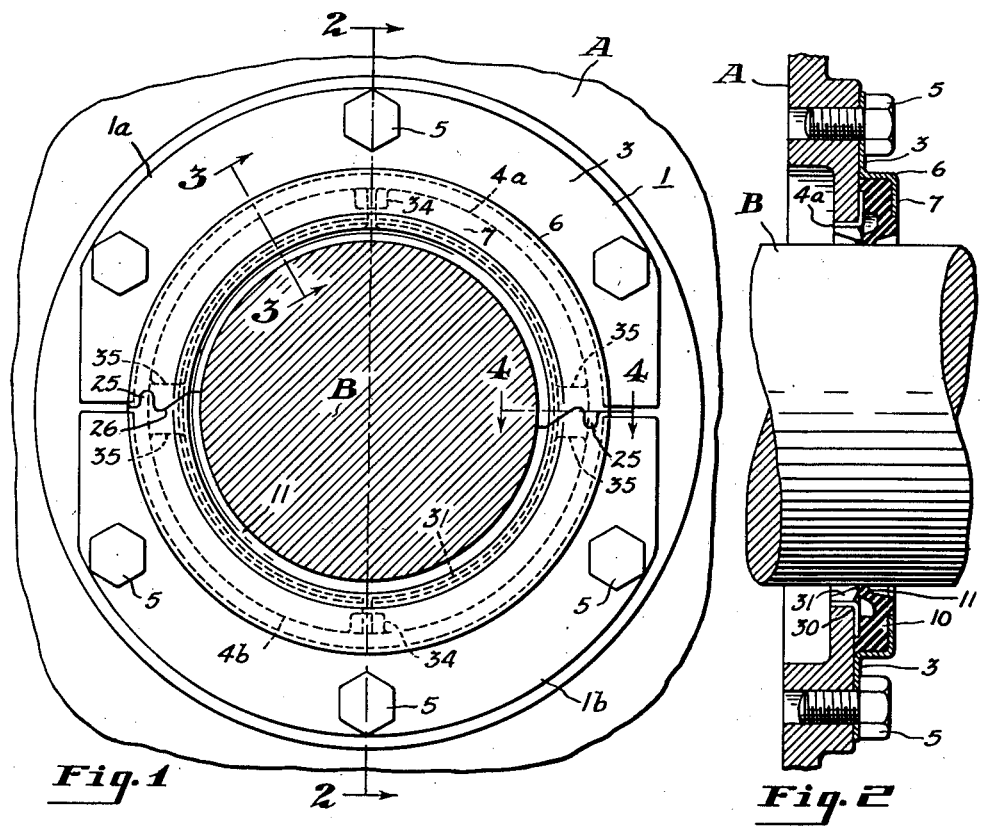
Figure 1 is an elevational view of a portion of an engine showing a seal embodying the present invention attached to the housing so as to seal the space between the shaft and the housing.
Fig. 2 is a vertical, sectional view taken on the line 2—2 of Fig. 1.

Referring more particularly to the drawings, in which like parts are designated by like numerals of reference throughout the several views, my improved seals have a main body portion 1 comprising a plurality of sections 1a, 1b, etc., which are preferably identical, and a split pressure ring 4 adapted to cooperate with the main body portion and having a plurality of sections 4a, 4b, etc., preferably also substantially identical.

The main body portion 1 has a split retaining collar 2, to be non-rotatably fastened to a suitable engine housing A by suitable fastening means, such as bolts 5. The split retaining collar has a disk portion 3 to bear against the housing, an off-set or cylindrical portion 6, and an integral, inwardly extending, annular flange 7. A split centrally apertured molded packing ring 10 of oil-resistant, resilient rubberlike material is carried by said collar within the re-entrant angle between said offset portion and said annular flange. The packing ring 10 is preferably bonded or attached to said retaining collar at the inner surfaces of said offset flange by suitable means such as a convenient, strong rubber-to-metal adhesive and its central aperture is preferably of generally frusto-conical shape. The molded packing ring 10 may have a C-shaped cross section with an annular, axially extending sealing lip portion 11 and an integral, axially extending housing sealing portion 13 with an annular sealing edge 14 adapted to contact the flat face of the housing 4. The housing sealing portion and the axially extending lip portion are connected by an integral, annular, radial portion 12.

Figures 3, 4, 5:
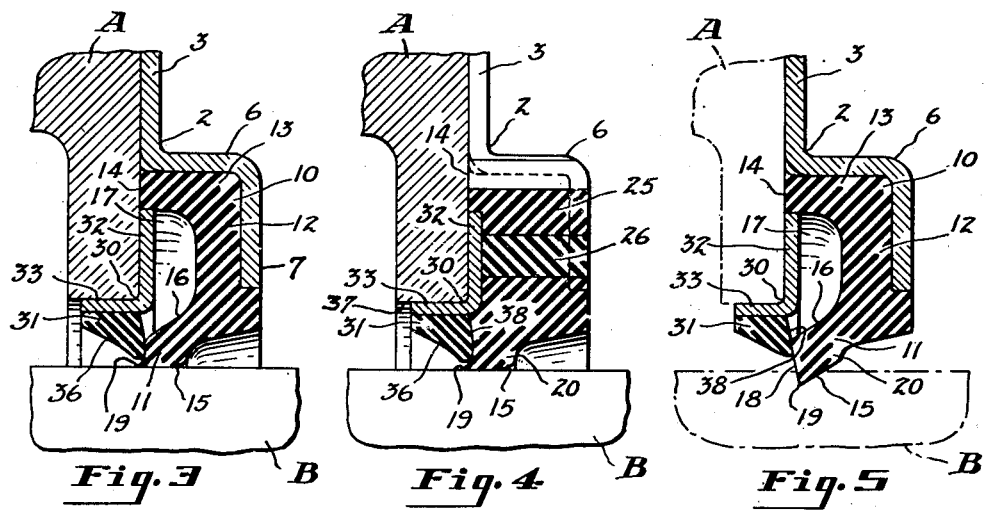
Fig. 3 is an enlarged sectional view taken on the line 3—3 of Fig. 1.
Fig. 4 is an enlarged sectional view taken on the line 4—4 of Fig. 1.
Fig. 5 is a sectional view taken through the same portion of the seal as in Fig. 3, but showing the arrangement of the parts in their molded position and unaffected and undistorted by the shaft.

The sealing lip portion 11 is preferably of substantially frusto-conical shape with a frusto-conical inner surface 15 adapted to contact the shaft and a frusto-conical outer surface 16. The lip 11, as shown in the modifications of the invention illustrated in Figs. 1 to 8, inclusive, and 10, is spaced from the housing sealing portion by the radial portion 12 so as to form an annular groove 17. A pressure face 18, which connects the inner and outer surfaces 15 and 16, respectively, of the lip 11, preferably intersects the inner conical surface 15 in an acute angle, forming a relatively sharp sealing edge 19. In order to assure more uniform operation and relatively low sealing area, it is preferred that the lip have an inner annular rib 20 on its inner surface adjacent the sealing edge 19.

Means, such as tongue and groove joints having tongues 25 and 26 adapted to cooperate respectively with grooves 27 and 28, is provided for aligning the separate sections 1a, 1b, etc., of the body 1, so that the sealing edge 19 and the inner surface 15 are retained in circular form when the body portion is assembled around a shaft. The resilient material of the molded packing ring protrudes somewhat beyond the metal of the retaining collar at the ends of the sections 1a, 1b, etc., and the tongues 25 and 26 are slightly larger than the grooves 27 and 28, so that when the sections are assembled end-to-end a tight and leakproof joint is obtained.

Means such as the split pressure ring 4 is provided for applying axial pressure against the free end of the lip 11 and preferably against the pressure face 18. The split pressure ring has an annular metal backing 30, preferably of angle-shaped cross section, and an annular resilient portion 31 carried by said backing and adhesively attached thereto. The rigid backing preferably has an annular radial portion 32 and an axially extending portion 33. The radial extending portion of the backing portion 30 is adapted to bear against the housing A on the one side and against the molded packing ring or resilient aligning or supporting lugs 34 and 35, carried by the packing ring 10 within the annular groove 17. It is thus means to locate and restrain the annular resilient portion 31 laterally with respect to the sealing lip.

The axially extending portion is adapted to extend within a cylindrical opening 37 in the housing surrounding the shaft; it thus serves as rigid means for vertically aligning and restraining the molded resilient portion 31 of the pressure ring with respect to the lip 11. The annular resilient portion 31 of the pressure ring 4 is preferably adhesively attached to the axially extending portion of the backing 30 and preferably has a substantially frusto-conical inner surface 36 and a pressure surface 38, which is adapted to bear against the pressure face 18 of the lip 11 when the main body portion 1 and the split pressure ring 4 are in assembled relationship. The resilient portions of each section 4a, 4b, etc., of the pressure ring extend slightly beyond the ends of the sections of the metal backing portion 30 to allow for slight compression of the resilient portions when the sections of the ring are assembled.

In the modifications illustrated in Figs. 1 to 7, inclusive, the pressure face 18 and the pressure surface 38 are substantially parallel and inclined with respect to the axis of the shaft. In the modification illustrated in Fig. 8, the pressure surface 38 of the pressure ring and the pressure face 18 of the molded packing ring are substantially vertical. Fig. 10 illustrates a modification wherein the resilient portion of the pressure ring has an inclined surface 39 which bears against the outer conical surface of the packing ring, so that axial pressure may also be imparted thereto by the resilient pressure member. The modification of Fig. 9 in which the groove 17 has been omitted from the resilient packing ring is desirable when very high sealing pressure is necessary on the rotating shaft.

The seals of the present invention are primarily adapted to seal the space adjacent the rear main bearing between the crankshaft and the housing of automobile engines. They may be applied either before or after the assembling of the flywheel on the crankshaft. In the usual operations of assembling, the split pressure ring is first applied against the housing in sections, as shown in the accompanying drawings, with the axially extending portion of the rigid backing inserted in the cylindrical space of the housing around the shaft. The body portion is then applied in sections around the shaft and against the housing, as shown, with the pressure face 18 or the free edge of the lip 11 directed toward the oil reservoir and in contact with the annular resilient portion of said pressure ring.

The sections of the pressure ring are preferably located with respect to the sections of the body portion, so that the ends of the sections of the split ring are intermediate the ends of the sections of the body portion and rest upon the intermediate supporting and aligning lugs 34 and the intermediate portions of the pressure ring contact the end supporting lugs 35.

When properly assembled, it is seen that the resilient portion 31 of the pressure ring exerts substantial lateral or axial pressure against the face of the sealing lip 11. It has been found that such lateral pressure has the effect of more firmly holding the sealing edge 19 on the shaft so that a more desirable seal is maintained. Since the resilient portion 31 of the pressure ring is restrained by or bonded to the backing portion 30 of the pressure ring, loss of pressure on the sealing lip due to its swelling or due to the swelling of the pressure ring is substantially eliminated.

Any of the oil-resistant synthetic rubbers, such as for example polychloroprene, and the co-polymers of butadiene with acrylic nitrile, styrene, vinyl chloride and certain other resin-forming materials, may be suitably compounded and used for forming the molded elements of the present invention. It is intended that the term "rubber-like material" includes such synthetic rubbers as well as natural rubber.

It is also apparent that numerous modifications of the invention may be made without changing the spirit thereof, and it is intended that it be limited only by the appended claims.

What I claim is:

1. An oil retaining device to seal the space between a housing and a shaft, comprising a split metal retaining collar having a disk portion to be fastened to a flat surface of said housing, an offset portion and an inwardly extending annular flange, a split centrally apertured C-shaped molded packing ring of oil-resistant rubberlike material adhesively carried by and bonded to said collar in the re-entrant angle between said offset portion and said flange of said collar and bearing against said inwardly extending flange, said packing ring having a radial portion and an annular axially extending lip portion integral with said radial portion and an annular housing sealing portion having an edge adapted to press against said housing, said collar and said molded packing ring having a plurality of substantially coextensive sections, aligning means at the end of each section for cooperating with the aligning means of another section, said rubberlike material extending beyond portions of said collar at said aligning means, and a split pressure ring having an angle-shaped metal backing portion adapted to bear against said housing, an annular resilient portion of rubberlike material carried by said backing portion and adapted to bear against and exert axial pressure on said sealing lip portion to hold it more strongly against said shaft, said molded packing ring having aligned and centering lugs of molded rubberlike resilient material carried within the grooves of said packing ring and adapted to bear against said backing portion of said pressure ring and to space said backing portion from said radial portion of said molded packing ring.

2. An oil retaining device to seal the space between a housing and a shaft, comprising a split retaining collar having a disk portion to be fastened to a flat surface of said housing, an offset portion and an inwardly extending annular flange, a split centrally apertured molded packing ring of oil-resistant rubberlike material adhesively carried by said collar in the re-entrant angle between said offset portion and said flange of said collar and bearing against said inwardly extending flange, said packing ring having a radial portion and an annular axially extending lip portion integral with said radial portion and an annular housing sealing portion having an edge adapted to press against a radial face of said housing, said collar and said molded packing ring having a plurality of substantially co-extensive sections, aligned means at the end of each section for cooperating with the aligning means of another section, and a split pressure ring separated from said body portion having an annular molded resilient rubberlike portion carried by a rigid backing portion and adapted to exert axial pressure on said sealing lip portion, said backing portion having an axially extending portion to bear against an axially extending portion of said housing for locating said annular resilient portion of said pressure ring vertically with respect to said sealing lip and a radially extending portion to bear against said molded packing ring on one side to align said molded portion of said pressure ring laterally with respect to said sealing lip.

3. An oil retaining device to seal the space between a housing and a shaft, comprising a split retaining collar having a disk portion to be fastened to said housing, an offset portion and an inwardly extending annular flange, a split centrally apertured molded packing ring of oil-resistant rubberlike material carried by said collar in the re-entrant angle between said offset portion and said flange of said collar and bearing against said inwardly extending flange, said packing ring having a radial portion and an annular axially extending lip portion integral with said radial portion, said collar and said molded packing ring having a plurality of substantially co-extensive sections, aligning means at the end of each section for cooperating with the aligning means of another section, and a split pressure ring having a plurality of sections and having an angle-shaped metal backing portion and an annular resilient portion carried by said backing portion, said backing portion having an annular axially extending portion adapted to bear against a cylindrical portion of said housing and a radial portion adapted to bear against a flat surface of said housing on the one side and against resilient aligning and supporting lugs carried by said molded packing ring on the other side, whereby said annular resilient portion of said pressure ring is located vertically and laterally to bear against said sealing lip to hold said sealing lip strongly against said shaft.

4. An oil retaining device to seal the space between a housing and a shaft, comprising a split retaining collar having a disk portion to be fastened to said housing, an offset portion and an inwardly extending annular flange, a split centrally apertured molded packing ring of oil-resistant rubberlike material carried by and bonded to said collar in the re-entrant angle between said offset portion and said flange of said collar and bearing against said inwardly extending flange, said packing ring having a radial portion and an annular axially extending frusto-conical lip portion integral with said radial portion and an annular housing sealing portion having an edge adapted to press against said housing, said collar and said molded packing ring having a plurality of substantially co-extensive sections, tongue and groove joints between sections, and a split pressure ring having an angle-shaped metal backing portion adapted to bear against said housing, an annular resilient portion carried by said backing portion and adapted to bear against and exert axial pressure on said sealing lip portion to hold it more strongly against said shaft, said molded packing ring having aligning and centering lugs adapted to bear against said backing portion of said pressure ring and to space said backing portion from said radial portion of said molded packing ring.

5. An oil retaining device to seal the space between a housing and a shaft, comprising a split retaining collar having a disk portion to be fastened to said housing, an offset portion and an inwardly extending annular flange, a centrally apertured molded packing ring of oil-resistant rubberlike material having substantially C-shaped cross section carried by and adhesively attached to said collar in the re-entrant angle between said offset and said flange and bearing against said inwardly extending flange, said packing ring having an annular axially extending lip portion, an integral radial portion and an integral axially extending housing sealing portion, said collar and said molded packing ring having a plurality of substantially co-extensive sections, aligning means at the end of each section for cooperating with the aligning means of another section, and a split pressure ring having an angle-shaped metal backing portion adapted to bear against said housing and an annular molded resilient portion of rubberlike material adhesively carried by said backing portion and adapted to bear against and exert axial pressure on said sealing lip portion to hold it more strongly against said shaft.

6. An oil retaining device to seal the space between a housing and a shaft, comprising a split retaining collar having a disk portion to be fastened to said housing, an offset portion and an inwardly extending annular flange, a centrally apertured molded packing ring of oil-resistant rubberlike material having substantially C-shaped cross section carried by and adhesively attached to said collar in the re-entrant angle between said offset and said flange and bearing against said inwardly extending flange, said packing ring having an annular axially extending lip portion, an integral radial portion and an integral axially extending housing sealing portion, supporting lugs in the groove between said axially extending portions of said packing ring, said collar and said molded packing ring having a plurality of substantially co-extensive sections, aligning means at the end of each section for cooperating with the aligning means of another section, and a split pressure ring having an angle-shaped metal backing portion adapted to bear against said housing, an annular resilient portion carried by said backing portion and adapted to bear against and exert axial pressure on said sealing lip portion to hold it more strongly against said shaft.

7. An oil retaining device to seal the space between a housing and a shaft, comprising a split retaining collar having a disk portion to be fastened to said housing, an offset portion and an inwardly extending annular flange, a centrally apertured molded packing ring of oil-resistant rubberlike material having substantially C-shaped cross section carried by and adhesively attached to said collar in the re-entrant angle between said offset and said flange and bearing against said inwardly extending flange, said packing ring having an annular axially extending lip portion, an integral radial portion and an integral axially extending housing sealing portion, said collar and said molded packing ring having a plurality of substantially co-extensive sections, aligning means at the end of each section for cooperating with the aligning means of another section, and a split pressure ring having a plurality of sections and having an angle-shaped metal backing portion and an annular resilient portion carried by said backing portion and adapted to bear against and exert axial pressure on said sealing lip to hold it more strongly against said shaft, said backing portion having a radial portion carried within the groove of said molded packing ring and adapted to bear against the housing on one side and against supporting lugs on the other side.

8. An oil retaining device to seal the space between a housing and a shaft, comprising a split retaining collar having a disk portion to be fastened to said housing, an offset portion and an inwardly extending annular flange, a centrally apertured molded packing ring of oil-resistant rubberlike material having substantially C-shaped cross section carried by and adhesively attached to said collar in the re-entrant angle between said offset portion and said flange and bearing against said inwardly extending flange, said packing ring having an annular axially extending lip portion, an integral radial portion and an integral axially extending housing sealing portion, said collar and said molded packing ring having a plurality of substantially co-extensive sections, aligning means comprising tongue and groove joints between adjacent sections, thickened molded lugs of resilient rubberlike material carried in the groove of said molded packing ring at the end portions of each section and extending into the tongue and groove portions thereof.

9. An oil retaining device to seal the space between a housing and a shaft and comprising a body portion having a split metal retaining collar and a split centrally apertured molded packing ring, said collar having a disk portion to be fastened to a flat surface of said housing, an offset portion and an inwardly extending annular flange, said split centrally apertured molded packing ring being of resilient material being adhered to and carried by said collar in the re-entrant angle between said offset portion and said flange and having an annular portion adapted to bear against said shaft, and means for exerting axial pressure against an unattached face of said packing ring to force said annular portion more strongly against said shaft, said body portion having a plurality of sections with tongue and groove joints between adjacent sections, the tongue portions of said joints being slightly larger than the grooved portions, whereby portions of said joint may be compressed and a leakproof joint may be obtained.

10. An oil retaining device to seal the space between a housing and a shaft and comprising a body portion having a split metal retaining collar and a split centrally apertured molded packing ring, said collar having a disk portion to be fastened to a flat surface of said housing, an offset portion and an inwardly extending annular flange, said split centrally apertured molded packing ring being of resilient material being adhered to and carried by said collar in the re-entrant angle between said offset portion and said flange and having an annular portion adapted to bear against said shaft, said body portion having a plurality of sections with tongue and groove joints between adjacent ends of adjacent sections, resilient material of said packing ring extending beyond the metal of said collar in portions of said joints, the tongue portions of said joints being slightly larger than the grooved portions, whereby said tongue portions may be compressed and a leakproof joint between sections obtained.

HOWARD M. DODGE.